L. CRAIG.
SHEARS.
APPLICATION FILED MAR. 18, 1911.
1,005,606. Patented Oct. 10, 1911.
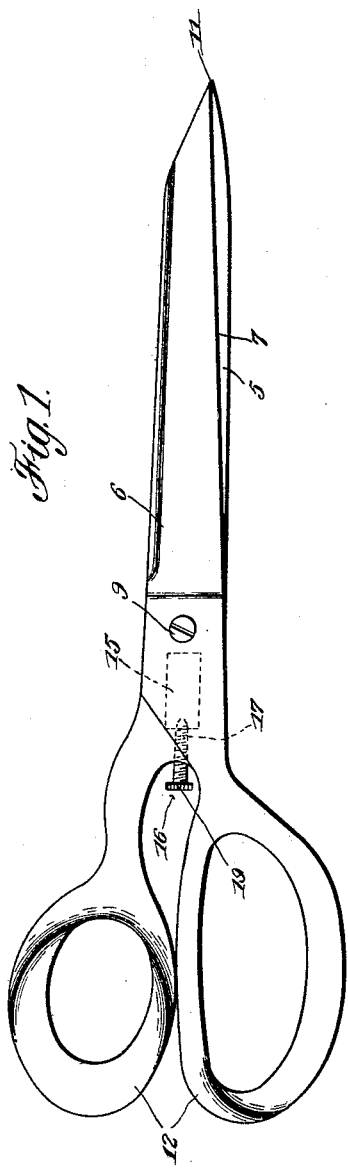
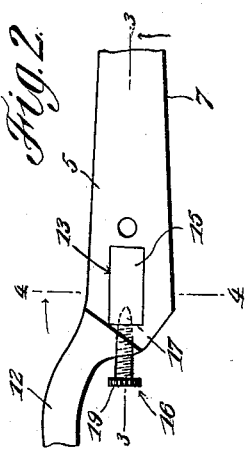
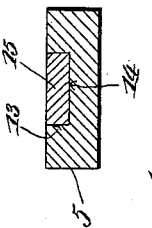
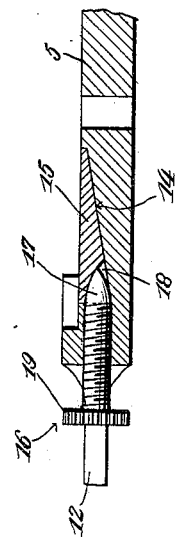
Witnesses
J. H. Crawford
Inventor
Levi Craig,
By Victor J. Evans
Attorney

UNITED STATES PATENT OFFICE.

LEVI CRAIG, OF CORINTH, KENTUCKY.

SHEARS.

1,005,606. Specification of Letters Patent. Patented Oct. 10, 1911.

Application filed March 18, 1911. Serial No. 615,330.

*To all whom it may concern:*

Be it known that I, LEVI CRAIG, a citizen of the United States, residing at Corinth, in the county of Grant and State of Kentucky, have invented new and useful Improvements in Shears, of which the following is a specification.

The invention relates to shears, and more particularly to the class of adjustable tensioned shears.

The primary object of the invention is the provision of shears in which the relative position of the blades may be tensioned to the required degree, so as to assure positive cutting action when the shears are in use.

Another object of the invention is the provision of shears in which the adjustable tensioning device is located therein between the handles of the same, thereby being out of the way of the user of the shears, so as to obviate discomfort to the said user.

A further object of the invention is the provision of shears which are simple in construction, thoroughly reliable and efficient in operation, capable of being properly tensioned for various uses, and which may be manufactured at a minimum expense.

With these and other objects in view, the invention consists in the construction, combination and arrangement of parts, as will be hereinafter more fully described, illustrated in the accompanying drawings, and pointed out in the claim hereunto appended. In the drawings: Figure 1 is a side elevation of shears constructed in accordance with the invention. Fig. 2 is an inner side view of one of the shear blades, showing the tensioning device, the shears being partly broken away. Fig. 3 is a sectional view on the line 3—3 of Fig. 2. Fig. 4 is a sectional view on the line 4—4 of Fig. 2.

Similar reference characters indicate corresponding parts throughout the several views of the drawings.

Referring to the drawings by numerals, the shears comprise a pair of cutting blades 5 and 6 which are of the ordinary well-known construction, having beveled inner cutting edges 7, the blades crossing one another intermediate their ends, and through the crossing point of the blades is a fulcrum pin or pivot 9, the latter being passed transversely through the blades, thereby connecting the same together. These blades 5 and 6, at their forward ends, are pointed, as at 11, as usual, while their opposite ends are provided with handles 12, whereby the blades may be opened and closed when cutting material in the ordinary well-known manner.

Formed in the blade 5, rearwardly of the pivot 9, is an elongated recess 13, the same being disposed longitudinally within the said blade, and has its bottom 14 forwardly beveled or inclined, the recess being adapted to receive a tension block 15, which, when displaced, will tension the blades 5 and 6, so as to bring the cutting edges thereof close together, whereby the blades, when closed, will positively sever or cut material, the tension block 15 being raised in a manner, as will be hereinafter more fully described.

Threaded in the rear end of the blade 5, at the juncture of its handle therewith, is an adjusting screw 16, having a tapered inner end 17, the latter working in a suitable notch 18, so that on the turning of the screw in one direction, the tension block 15 will be raised, thereby tensioning the blade, the screw being provided with a knurled head 19, whereby it may be manually rotated for the adjustment of the tension block for the tensioning of the said blade.

From the foregoing, taken in connection with the accompanying drawings, it is thought that the construction and operation of the invention will be readily understood without requiring a more extended explanation, and therefore the same has been omitted.

What is claimed is:

In shears, pivotally connected cutting blades, tensioning means carried by one of the blades, said tensioning means comprising a semi-wedged shaped block mounted in a longitudinal recess having its bottom forwardly inclined and disposed at the rear of the pivotal connection with the other blade, an adjusting screw projecting between the handles on the blades, said screw having a tapered point, said point adapted to engage one of the inclined faces of the semi-wedge shaped block to displace the same transversely, the said tapered end of the screw being designed to wedge between the said block and the blade adjacent thereto.

In testimony whereof I affix my signature in presence of two witnesses.

LEVI CRAIG.

Witnesses:
CARLISLE BALDWIN,
JUSTIN DAVIS.

Copies of this patent may be obtained for five cents each, by addressing the "Commissioner of Patents, Washington, D. C."